United States Patent [19]

Asdigian

[11] 4,201,626
[45] May 6, 1980

[54] LIQUID-LIQUID CONTACTING APPARATUS

[75] Inventor: George Asdigian, Des Plaines, Ill.

[73] Assignee: UOP Inc., Des Plaines, Ill.

[21] Appl. No.: 936,429

[22] Filed: Aug. 24, 1978

[51] Int. Cl.² .................. B01D 11/04; C10G 21/00
[52] U.S. Cl. .................. 196/14.52; 137/533.13; 202/158; 261/114 VT; 422/256; 422/257
[58] Field of Search .................. 422/256, 257, 47; 261/114 VT; 137/533.11, 533.13, 533.17; 202/158; 196/14.52

[56] References Cited

U.S. PATENT DOCUMENTS

| | | | |
|---|---|---|---|
| 2,252,924 | 8/1941 | Hale | 137/533.13 |
| 2,461,304 | 2/1949 | Wilson | 137/533.13 X |
| 2,674,406 | 4/1954 | Heckendorf | 137/533.13 X |
| 2,718,901 | 9/1955 | Nutter | 137/533.17 X |
| 2,809,821 | 10/1957 | Costantikes | 261/114 VT |
| 3,293,149 | 12/1966 | Lengemann et al. | 202/158 |
| 3,325,155 | 6/1967 | Bakout | 202/158 X |
| 4,091,839 | 5/1978 | Donner | 137/533.13 |
| 4,131,431 | 12/1978 | Siposs | 422/47 X |

FOREIGN PATENT DOCUMENTS 485050  10/1929  Fed. Rep. of Germany .... 261/114 UT

Primary Examiner—Michael S. Marcus
Attorney, Agent, or Firm—James R. Hoatson, Jr.; John F. Spears, Jr.; William H. Page, II

[57] ABSTRACT

An apparatus for performing liquid-liquid contacting operations, such as the extraction of mercaptans from hydrocarbons. The apparatus comprises a metal sphere which is retained in position above a mating valve seat in the upper open end of a vertical collar by a vertical retention cage. The collar extends through a horizontal plate, and a first liquid passes upward through a vertical bore in the collar to lift the sphere and contact a second liquid retained above the horizontal plate.

5 Claims, 2 Drawing Figures

LIQUID-LIQUID CONTACTING APPARATUS

FIELD OF THE INVENTION

The invention relates to an apparatus for contacting two immiscible liquids. More specifically, the invention relates to an apparatus for multi-stage liquid-liquid extraction operations which adjusts for variable liquid flow rates. The invention relates directly to an extraction apparatus for use in a vertical sieve-tray column and which acts as a supplement to the perforations in the trays of the column. Apparatus which may be used in liquid-liquid extraction processes is found in Class 23-270.5 and in other classes, such as Classes 55 and 261. The apparatus may be used in various liquid-liquid extraction processes including those found in Classes 208-311 to 208-337.

PRIOR ART

Liquid-liquid extraction is well established as a commercial method of purifying or separating hydrocarbons and other chemical compounds. It is often used to separate hydrocarbons when distillation is more expensive or impractical. A very extensive review of the art is contained in a number of articles published as pages 49-104 of *Chemical Engineering Progress*, (Vol. 62, No. 9) September, 1966. Instruction in the design of extraction processes and the selection of suitable equipment is provided in standard reference materials such as *The Chemical Engineers' Handbook*, 4th Ed., McGraw-Hill Publishing Co. and Treybal, *Mass Transfer Operations*, 2d Ed., McGraw-Hill Publishing Co. These references recognize that the liquid velocity through a contacting device is an important variable which effects extraction efficiency.

It is also known in the art that it is desirable to design liquid-liquid extraction columns which have good extraction efficiency over a wide range of feed stream flow rates. This could be achieved by mechanically adjusting the available cross-sectional area of the perforations in the extraction trays. Unfortunately, no variable opening apparatus has been developed and widely accepted by industry. The total open area of a tray may be adjusted when the extraction process is not operating by "blanking off" a portion of the tray's upper surface with imperforate plates. This is effective but can only be performed after the process is shut down and requires a large expenditure of time and labor.

An alternative method of adjusting the liquid velocity through the perforations in the tray is used commercially. In this method, a portion of the treated liquid sufficient in quantity to provide the desired feed stream flow rate is recirculated upward through the apparatus. This recirculation has the disadvantages of increased utility costs and the possible dilution of the feed stream.

Another alternative method is shown in U.S. Pat. No. 4,039,389 (Cl. 196-14.52). This reference describes a process and an apparatus for liquid-liquid extraction featuring a vertical column having an intermediate extract draw-off point. The trays below this intermediate point have a larger free area than those above, thereby providing two extraction zones having their peak efficiency at different rates of flow for the upward flowing liquid.

U.S. Pat. No. 3,860,402 (Cl. 55-90) is relevant for its showing of the use of spherical contactors in a gas-liquid absorption process. The fluidizable spheres are confined to linearly defined vertical paths above round seats which are located at openings in a horizontal base plate.

The design of countercurrent liquid-liquid extraction columns is a well developed art. Some examples are found in U.S. Pat. Nos. 2,752,229; 2,768,071; 2,872,295 and 3,730,690 (all Cl. 23-270.5).

BRIEF SUMMARY OF THE INVENTION

The invention provides a liquid-liquid extraction apparatus in which the area available for upward liquid flow is automatically and continuously adjusted to compensate for changes in the flow rate of the upward flowing liquid stream. One embodiment of the invention may be characterized as a liquid-liquid contacting apparatus which comprises a horizontal plate which forms part of a liquid-liquid extraction tray mounted in a vertical column and which has a circular perforation having a first diameter; a cylindrical vertical collar mounted in the circular perforation by attachment to the horizontal plate and extending through this circular perforation, with an inwardly slanting circular valve seat contoured into an upper open end of the collar and with a vertical cylindrical passageway extending downward through the collar from the valve seat to a lower open end of the collar; a hollow imperforate metallic sphere having a diameter which provides a contacting surface mating with the valve seat of the collar, the sphere being retained in position above the valve seat by a perforate retention cage connected to the collar and comprising two or more vertical guides connected to a common horizontal member which extends across the upper open end of the collar.

DESCRIPTION OF THE DRAWING

Referring now to FIG. 1, a cylindrical collar 2 is welded into a circular opening in a horizontal plate 1. An imperforate hollow metallic sphere 3 rests on the upper surface of an optional horizontal support arm 8. This support arm is formed by a rectangular bar which is affixed to two sides of a vertical bore or passageway extending from the upper open end of the collar to the lower open end of the collar. At the upper end of this passageway, a valve seat 4 is contoured into the upper end of the collar. The size of the sphere is matched to this valve seat as described herein.

Liquid flowing upward through the collar flows through a circular opening between the valve seat and the sphere. This liquid stream has a high velocity and contacts a denser liquid retained on the upper surface of the horizontal plate. The greater pressure within the vertical passageway also causes the rising less dense liquid to flow outward through the optional ducts 9 which extend horizontally through the wall of the collar.

The vertical and horizontal movement of the sphere is restrained by a retention cage formed by the vertical guide bars 5 and a horizontal connecting member 6. A slight clearance necessary to prevent binding is allowed between the sides of the sphere and the guide bars. A greater but still limited distance is provided between the top of the sphere and the bottom edge of the horizontal member 6 to limit the maximum possible opening between the sphere and the valve seat. The lower ends of the guide bars are mounted in vertical grooves spaced apart around the outer surface of the collar.

Figure 1:
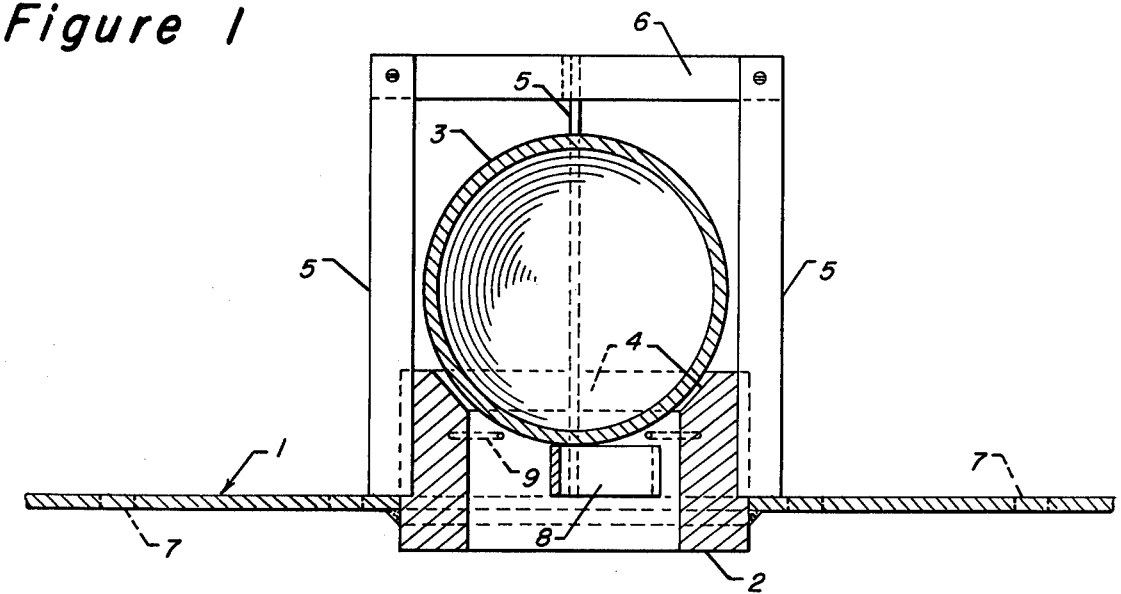
FIG. 1 is a cross-sectional view of the preferred embodiment of the apparatus taken along a vertical plane at the centerline of the apparatus.
Figure 2:
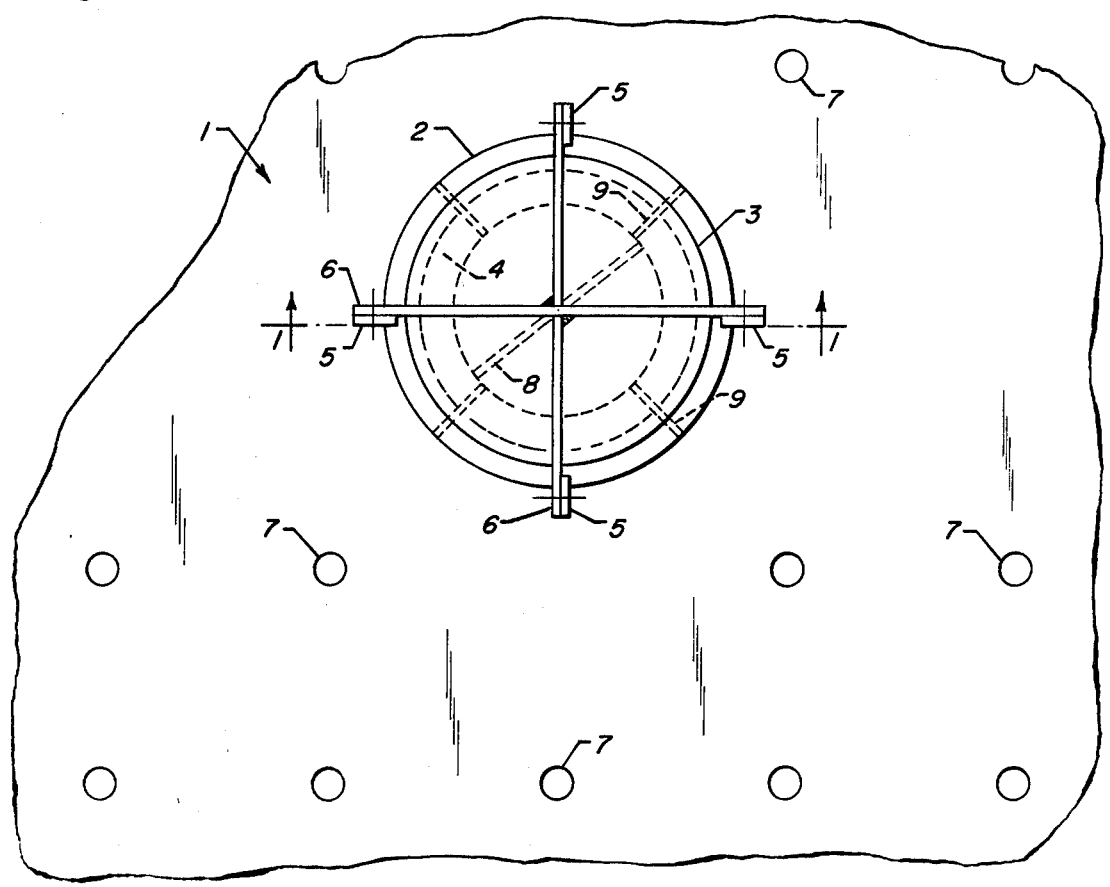
FIG. 2 is the view of the same apparatus as seen from above and includes an enlarged portion of the horizontal plate which forms part of an extraction tray.

In FIG. 2, the actinomorphic structure of the collar 2 and the sphere 3 is apparent. The sphere covers the support arm 8 and the valve seat 4 located at the upper end of the collar. Four of the optional horizontal liquid ducts 9 extend radially through the wall of the collar. Four vertical guide bars 5 are bolted to an X-shaped horizontal connecting member 6, which extends across the upper open end of the collar. Preferably, a smaller number of guide bars than shown is used. A plurality of the small circular openings 7 typical of those found in sieve-plate contacting trays are also present on the horizontal plate 1. The less dense liquid also flows upward through these openings.

This representation of one embodiment of the invention is not intended to limit the inventive concept to this specific embodiment or to exclude those other embodiments described herein or which result from reasonable and normal modification of the disclosed embodiments.

DETAILED DESCRIPTION

In liquid-liquid extraction processes, two relatively immiscible liquids are contacted to effect the transfer of one or more chemical compounds from a feed stream to a solvent stream. This is often repeated in several stages of contacting and separation with the two liquid streams flowing countercurrently to maximize the amount of the chemical compounds transferred. In a liquid-liquid extraction column, one stream such as the feed stream may pass upward through perforations in horizontal trays while a second denser stream flows across the trays and downward through downcomer conduits between the trays. At each stage of this operation, it is desirable to achieve a high extraction efficiency, as this minimizes the number of contacting stages required and therefore the size of the necessary equipment.

Liquid-liquid extraction efficiencies are tied to the degree of admixture at each contacting stage. In a sieve-plate column, the degree of admixture is basically controlled by the velocity of the liquid flowing through the individual perforations spread across the tray. Accordingly, the efficiency of extraction operations in sieve-plate columns is closely related to the liquid velocity through the perforations. Sieve-plate columns are therefore designed to provide a total open area which provides an optimum velocity at the perforations based on the expected flow rate of the liquid stream passing upward through these perforations. The "open area" of a tray is the combined cross-sectional area of the contacting perforations of one tray or stage. That is, it is the total area provided for the upward passage of liquid through the extraction tray.

It is often necessary or desirable to operate an extraction column while the upward rising stream has a flow rate which is significantly greater or less than the design flow rate of this stream. This may be because of such factors as equipment failure or maintenance, shortages of feed material or changes in the economic variables of the process. Sizable changes in the flow rate may result in inefficient extraction, and this can cause the production of low quality products or the poor recovery of the valuable materials which the extraction operation is designed to recover.

It is an objective of the invention to provide a liquid-liquid extraction apparatus which retains a good extraction efficiency over large variations in liquid flow rates. It is another objective of the invention to provide a liquid-liquid extraction apparatus suitable for installation in sieve-plate columns and which allows the column to have a good efficiency at reduced or elevated feed stream flow rates.

One of the basic elements of the invention is a cylindrical collar designed to be mounted in a vertical position in an extraction column or other type of extraction apparatus. This collar may be formed from a section of thick-walled pipe and preferably has a top to bottom height of about 2–5 inches. The outside diameter of the collar may be within the broad range of about 2 to 8 inches but is preferably greater than 4 inches. Preferably, the wall thickness of the pipe is in excess of $\frac{3}{8}$-inch. The collar is mounted in a circular perforation which has a diameter slightly greater than that of the collar. The collar is preferably attached to the horizontal plate by welds along the bottom surface of the horizontal plate. The collar preferably extends below the bottom surface of the horizontal plate only that distance required to easily weld it in place. The collar should have the form of a right-angled cylinder. That is, the upper and lower surfaces of the collar are formed by cutting along planes perpendicular to the central axis which passes through a cylindrical section of the pipe.

A valve seat is machined into the upper end of the collar. This valve seat preferably has a flat taper at an angle of about 45°–60° above horizontal, but angles in the range of 30°–75° may also be used. That is, it is not required that the valve seat is curved to conform to the outer surface of the sphere or other element which rests therein. The valve seat will have an inward taper. As used herein, the term "inward" refers to a direction which is toward the central vertical axis of the collar.

A second basic and required element of the invention is an imperforate sphere of a size suitable for resting in a valve seat at the top of the collar. The sphere must have an average specific gravity greater than the denser liquid which is to be used in the extraction apparatus. Unless otherwise specified, any reference to specific gravity refers to the ratio of the density of the sphere to the density of water at standard conditions. The sphere is preferably metallic, and may be formed from carbon or stainless steel, brass, aluminum or any other suitable metal. The sphere may be made from materials other than metal including various plastics or ceramics.

The sphere is preferably hollow and is to present a monolithic or imperforate outer surface. The average density of the sphere will be chosen to provide a significant resistance to its fluidization or lifting by the liquid stream which is passing upward through the vertical passageway of the collar. Such a resistance is necessary to ensure that the liquid flow path is restricted and a high liquid velocity is achieved as the liquid leaves the opening between the sphere and the collar. The weight of the sphere must counteract the buoyant force of the denser liquid and the upward force of the less dense liquid. The upward force of the rising liquid which must be counteracted may be estimated based on the surface area of the sphere which this liquid pushes on and the pressure drop which it is desired to maintain between the bottom and top of the horizontal plate.

Spheres having different densities may be utilized within the same apparatus in order to further increase the range of flow rates which may be effectively processed in the apparatus. The sphere should have an outer diameter which provides close contact between the outer surface of the sphere and the circular valve seat at the top of the collar. Preferably, the outer diameter of the sphere is approximately equal to the outer diameter of the collar to provide a contacting surface matching the valve seat of the collar. The diameter of the sphere is therefore preferably within the range of from about 2 inches to about 8 inches. Provision is preferably made for the adjustment of the average density of the spheres by the insertion of weights within their hollow centers. Steel or lead shot may be used to adjust the weight of the spheres.

The present invention is intended to provide a variable opening extraction apparatus which is to be used in conjunction with other types of fixed openings or passageways for the rising liquid. It may however be the only form of contacting perforation utilized in the total or integrated contacting apparatus. It is preferred that a relatively large number of the standard circular openings common to sieve-plate extraction trays are also located in the horizontal plate to which the collar is mounted. The smaller circular openings will normally have a diameter ranging from about $\frac{1}{4}$-inch to $\frac{3}{8}$-inch, but may be as large as $\frac{1}{2}$-inch.

As the flow rate of the stream passing upward through an extraction column utilizing both the present invention and standard perforations increases, the velocity through each of the smaller perforations will gradually increase. The pressure differential between the lower and upper surfaces of the horizontal trays of the column will also gradually increase. At low flow rates, this pressure differential will not be sufficient to cause the spheres to rise out of the valve seat, and therefore there will be little or no liquid flow upward through the collar. However, the apparatus is designed, using fluid flow force balances on the spheres, to provide spheres having a weight to cross-sectional area ratio which will result in the spheres being gradually lifted when the flow rate of the rising liquid reaches a certain preselected magnitude. This design flow rate preferably is equal to the maximum flow rate which is efficiently handled by the small diameter perforations of the sieve-plate section of the horizontal tray. That is, the spheres are designed to remain resting in the upper end of the collar until it becomes desirable to increase the open area of the tray and to limit the upward velocity through the small diameter perforations.

When the pressure beneath the sphere is sufficient to cause the sphere to rise, some of the liquid passing upward through the apparatus will begin to flow through the vertical passageway of the collar and will be ejected into the liquid passing across the horizontal plate. The rising liquid will be sprayed upward or outward at a high velocity and will be dispersed in a coneshaped pattern generated by the circular opening between the sphere and the valve seat. The sphere is prevented from rising to any great extent by a retention cage which surrounds the sphere. Preferably, the maximum distance which the sphere may rise is about $\frac{3}{8}$-inch for the larger spheres. This is to insure that the sphere stays positioned at a location which generates a turbulent, high velocity and well dispersed stream of the rising liquid. This specified distance is measured between the upper surface of the sphere when the sphere is seated in the valve seat and the lower surface of that portion of the retention cage which the sphere contacts when it is caused to move directly upward from the valve seat. It is preferred that this distance be at least $\frac{1}{4}$-inch for all sphere sizes.

The retention cage preferably comprises two vertical guides which are attached to the collar and which extend upward above the sphere. These vertical guides or guide bars may be formed by rectangular bar stock which is welded into vertical slots evenly spaced around the outer surface of the collar. This method of constructing the retention cage is illustrated in the drawing. The attachment of the guide bars to the collar may be performed prior to the assembly of the entire extraction column, and this method of assembly is preferred since it provides an outer shoulder which supports the collar when the collar is later inserted into the circular opening of the horizontal plate. The shoulder thereby correctly positions the collar and retains the collar in position while it is being welded from the bottom. Two, three, four or more vertical guide bars may be utilized to construct the retention cage.

The assembly of the retention cage is completed by attaching one or more horizontal members to the upper ends of the guide bars. A single straight horizontal member similar in shape to the guide bars may be bolted to a pair of diametrically opposed guide bars to provide a sufficient completion of the retention cage. As an alternative, an X-shaped horizontal member may be adjoined to four vertical guide bars in the manner shown in the drawing.

The structure of the retention cage may be varied in innumerable ways. It must however prevent the sphere from rising more than the desired amount or entirely escaping from the upper end of the collar. The retention cage preferably prevents the sphere from moving horizontally more than about 1/32-inch off center from the central vertical axis of the collar. However there should be sufficient play between the sphere and the sides of the retention cage to prevent the sphere from becoming lodged in a raised position in the retention cage. A total clearance of up to $\frac{1}{8}$-inch is believed sufficient. The upper end of the retention cage may have a curved shape conforming to the outer surface of the sphere.

As an alternative structure of the retention cage, a piece of rectangular bar stock could be twisted 90 degrees about its central axis, the section of the bar beyond the twist bent back on itself to form a smooth curve, and the bar again twisted 90 degrees. This would form a unitary U-shaped bridge or clevis, the ends of which could be inserted into the horizontal slots on the side of the collar in the same manner as the vertical guide bars shown in the drawing. As another alternative, only one horizontal cross piece can be used. This could be connected to vertical guide bars on diametrically opposing sides of the collar. It is not necessary for all of the vertical guide bars to be of the same height or to be connected to a horizontal cross piece. The retention cage should have the minimum structure which effects its functions to avoid interrupting fluid flow.

The preferred embodiment of the invention may be characterized as a liquid-liquid contacting apparatus which comprises a horizontal plate which forms part of a liquid-liquid extraction tray and which has a circular perforation having a first diameter; a cylindrical vertical collar mounted in said circular perforation by attachment to the horizontal plate and extending through said circular perforation, with an inwardly slanting circular valve seat contoured into an upper open end of the collar and with a vertical passageway extending through the collar from said circular valve seat to a lower open end of the collar; a hollow imperforate sphere having a specific gravity greater than 1.0 and having a diameter which provides an outer contacting surface capable of providing a seal by seating in the circular valve seat of the collar, the sphere being positioned above the valve seat; and, a retention cage which encloses the sphere, the retention cage being connected to the collar and having an upper inner surface located a preset distance above the sphere when the sphere rests in the valve seat, with several openings being present in the retention cage, there being no opening in retention cage large enough for the sphere to pass through.

An optional variation of the structure of the apparatus is the provision of several small diameter horizontal ducts or passageways through the wall of the collar. These ducts may be circular openings from about ⅛- to about ⅜-inch in diameter formed by drilling holes through the outer wall of the collar. They are preferably located at a point which is below the valve seat and is about intermediate in the upper end of the collar and the upper surface of the horizontal plate in which the collar is mounted. The purpose of these holes is to provide high velocity streams of the rising liquid which will agitate the denser liquid retained upon the upper surface of the horizontal plate. This may be necessary if the collar is located on a portion of the horizontal tray which is not subjected to adequate liquid mixing by the flow of the upward or downward flowing liquids. It is preferred that no more than eight of these ducts are provided in any single collar.

A second optional element which may be utilized in the subject invention comprises a support arm which prevents the sphere from entirely seating in the valve seat. That is, an upper edge of the support arm is at an elevation within the vertical passageway of the collar at which it contacts the sphere before the sphere is able to settle downward as far as it would if the support arm was not present. The purpose of the support arm is to provide a small opening on the order of about 1/16-inch between the sphere and the upper surface of the valve seat to maintain a minimum opening for the upward passage of liquid. That is, the support arm prevents the sphere from fully seating in the valve seat of the collar.

In this embodiment of the invention, there is thereby provided means for maintaining at least a small uninterrupted stream of the rising liquid through the collar. This is believed advantageous in the prevention of pulsing or rapid erratic vertical movements of the sphere. This support arm may be formed in many ways. It may comprise an L-shaped bar having one end attached to the bottom end of the collar and extending upward within the vertical passageway of the collar. Preferably, it is formed by a horizontal bar extending across the vertical passageway and attached to the inner surface of the passageway in a manner similar to the support arm shown in the Drawing. The upper surface of the support arm may be flat or may be contoured to match the curvature of the sphere. During those times when the upward liquid flow is insufficient to cause the sphere to rise from the valve seat, the sphere will normally rest upon the support arm at one point and against the vertical guide bars at one or more other points. The sphere will be slightly off-center at these times.

The variable opening contactors of the subject invention may be uniformly spread across the surface area of the horizontal plate or tray of the extraction column. They may be concentrated in one area, such as near the inlet downcomer. The number of variable opening contactors used on any one tray of an extraction column is preferably more than one but less than twenty. The other elements of the extraction tray may be constructed in a customary manner after due consideration is given to the interrelationships between the operation of the variable opening contactors and these other structures. Inlet and outlet weirs and downcomers similar to those now used in extraction columns may be employed in conjunction with the variable opening contactor.

The subject apparatus may be used in performing several different extraction processes. These include the extraction of mercaptans from a hydrocarbon stream by an alkaline solution which is subsequently subjected to a catalyzed oxidation as described in U.S. Pat. Nos. 2,853,432 (Cl. 196-32); 2,921,020 (Cl. 208-205); 3,148,156 (Cl. 252-420) and 3,574,093 (Cl. 208-206). The subject apparatus may also be used for the removal of aromatic hydrocarbons from a feed stream which also contains non-aromatic hydrocarbons. This process is described in U.S. Pat. Nos. 3,492,222 (Cl. 208-321); 3,361,664; 3,643,614 (Cl. 208-321); 3,721,620 (Cl. 208-317) and 3,862,254 (Cl. 260-674). The apparatus may also be used to remove acid gases such as hydrogen sulfide from a hydrocarbon stream by extraction with an aqueous amine solution.

The inventive concept therefore includes a liquid-liquid extraction process which comprises passing a first liquid stream, which may be either a feed stream or a solvent stream, downward from tray to tray through an extraction column in a customary manner; passing a less dense second liquid stream into a bottom portion of the column; dividing the second liquid stream into a first portion and a second portion; passing the first portion of the second liquid stream upward through a plurality of perforations in a first tray having a fixed cross-sectional area to contact the first liquid stream at extraction-promoting conditions; passing the second portion of the second liquid stream upward through perforations in the first tray having a variable cross-sectional area formed by the lifting action of the upward flowing second portion of the second liquid stream upon an imperforate sphere retained above a cylindrical collar having a vertical passageway extending through the first tray; recombining the first and second portions of the second stream and removing the second stream in an upper portion of the column; and removing the first liquid stream in the bottom portion of the column.

I claim as my invention:

1. A tray for use in a liquid-liquid contacting apparatus which comprises:
   (a) a horizontal plate having a circular perforation;
   (b) a cylindrical vertical collar mounted in said circular perforation by attachment to the horizontal plate and extending through said circular perforation, with an inwardly slanting circular valve seat contoured into an upper open end of the collar and with a vertical passageway extending through the collar from said circular valve seat to a lower open end of the collar;
   (c) a plurality of spaced horizontal ducts extending radially through the wall of said collar and located at a point below said circular valve seat and exiting said collar at a point above said horizontal plate to provide high velocity streams of rising liquid which will agitate denser liquid retained upon the upper surface of said horizontal plate;
   (d) a hollow imperforate sphere having a specific gravity greater than 1.0 and a diameter which provides a contacting surface matching the circular vlave seat of the collar, the sphere being positioned above the valve seat; and (e) a retention cage which encloses the sphere, the retention cage being connected to the collar and having an upper surface located a preset distance above the sphere when the sphere rests in the valve seat, with several openings being present in the retention cage, there being no opening in the retention cage large enough for the sphere to pass through.

2. The apparatus of claim 1 further characterized in the provision of a plurality of spaced apart circular openings on the horizontal plate.

3. The apparatus of claim 1 further characterized in that the retention cage comprises two vertical guide bars extending upward from said collar, the vertical guide bars having lower ends spaced apart around the upper open end of the collar and having upper ends attached to a horizontal connecting member which extends across the upper open end of the collar.

4. The apparatus of claim 3 further characterized in that the horizontal connecting member is at an elevation above the collar which limits the vertical movement of the sphere to less than one-half inch.

5. The apparatus of claim 4 further characterized in that a horizontal support arm is positioned within the vertical passageway of the collar and has an upper surface which supports the sphere at an elevation which prevents the sphere from seating in said valve seat.

* * * * *